(12) United States Patent
Wu et al.

(10) Patent No.: US 7,000,210 B2
(45) Date of Patent: Feb. 14, 2006

(54) ADAPTIVE ADJUSTMENT OF CONSTRAINTS DURING PLD PLACEMENT PROCESSING

(75) Inventors: Qinghong Wu, Santa Clara, CA (US); Yinan Shen, Santa Clara, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 89 days.

(21) Appl. No.: 10/288,667

(22) Filed: Nov. 5, 2002

(65) Prior Publication Data

US 2004/0088671 A1  May 6, 2004

(51) Int. Cl.
    *G06F 17/50* (2006.01)
(52) U.S. Cl. .......................................... 716/16; 716/12
(58) Field of Classification Search .............. 716/1–18; 326/38, 39
    See application file for complete search history.

(56) References Cited

U.S. PATENT DOCUMENTS

| | | | |
|---|---|---|---|
| RE34,363 E | | 8/1993 | Freeman |
| 5,448,493 A | | 9/1995 | Topolewski et al. |
| 5,790,882 A | * | 8/1998 | Silver et al. ............... 712/37 |
| 6,018,624 A | * | 1/2000 | Baxter ........................ 703/16 |
| 6,086,629 A | | 7/2000 | McGettigan et al. |
| 6,363,519 B1 | * | 3/2002 | Levi et al. .................. 716/16 |
| 6,480,023 B1 | * | 11/2002 | Kaviani ....................... 326/38 |
| 6,484,298 B1 | | 11/2002 | Nag et al. |
| 6,490,707 B1 | * | 12/2002 | Baxter .......................... 716/2 |
| 6,510,546 B1 | * | 1/2003 | Blodget ....................... 716/16 |
| 6,515,509 B1 | * | 2/2003 | Baxter ......................... 326/39 |
| 6,629,308 B1 | * | 9/2003 | Baxter ......................... 716/16 |
| 6,757,879 B1 | | 6/2004 | Kong et al. |
| 6,763,506 B1 | * | 7/2004 | Betz et al. .................... 716/6 |
| 2001/0047509 A1 | * | 11/2001 | Mason et al. ................ 716/18 |
| 2004/0088671 A1 | * | 5/2004 | Wu et al. ..................... 716/16 |

OTHER PUBLICATIONS

"Timing-driven Placement Based on Partitioning with Dynamic Cut-net Control," by Shih-Lian Ou and Massoud Pedram, Department of EE-Systems, University of Southern California, Los Angeles, CA 90089, 2000.

* cited by examiner

*Primary Examiner*—Vuthe Siek
*Assistant Examiner*—Binh Tat

(57) ABSTRACT

A technique for mapping a plurality of configurable logic blocks in a programmable logic device, such as a field-programmable gate array (FPGA). The method includes adaptively adjusting one or more customer-specified constraints and can be implemented, for example, using a simulated annealing algorithm. During the refinement of the placement (i.e., assignment) of logic blocks in an FPGA, one or more constraints are adjusted by either selecting a customer-specified constraint value or specifying a new constraint value derived based on the actual circuit performance. The method provides substantial savings of computer time compared to the prior art placement methods and improves circuit performance, e.g., by enabling higher circuit operation frequencies.

19 Claims, 6 Drawing Sheets

ADAPTIVE ADJUSTMENT OF CONSTRAINTS DURING PLD PLACEMENT PROCESSING

TECHNICAL FIELD

The present invention relates to programmable logic devices (PLDs), such as field-programmable gate arrays (FPGAs), and, more specifically, to computer-aided design (CAD) tools for such devices.

BACKGROUND

An FPGA is a programmable logic device that has an array of configurable logic blocks (CLBs) connected together via a programmable routing structure. A typical FPGA may have tens of thousands of CLBs, each CLB having a plurality of primitive logic cells. Primitive cells of a CLB may include, e.g., flip-flops interconnected in a variety of ways to implement a desired logic function corresponding to that CLB. For example, each CLB may have lookup tables, multiplexers, and/or registers.

FIGS. 1A–B illustrate a representative FPGA architecture. In particular, FIG. 1A shows schematically an FPGA 100 comprising a plurality of CLBs 102 surrounded by input-output (I/O) blocks 104 and interconnected through a routing structure 106. CLBs 102 are typically connected to form a plurality of nets, one of which, net 110, is depicted in FIG. 1B. Illustratively, net 110 has ten CLBs 102 interconnected via routing structure 106 (not shown in FIG. 1B) as indicated by the solid lines. The physical dimensions of net 110 are characterized by a bounding box 120 of height a and width b shown by the dashed lines in FIG. 1B. A different net may include a different number of CLBs 102 and/or one or more I/O blocks 104. Each CLB 102 and/or I/O block 104 may belong to more than one net.

When an FPGA, such as FPGA 100 of FIG. 1, comprises thousands of CLBs in a large number of nets, the task of establishing the required multitude of interconnections between the CLBs in a net and between the different nets becomes so onerous that it requires CAD implementation. Accordingly, manufacturers of FPGAs including the assignee hereof, Lattice Semiconductor, Inc., develop place-and-route CAD tools to be used, e.g., by their customers (FPGA programmers) to implement their respective circuit designs. Typically, place-and-route software implements an iterative process aimed at producing a circuit configuration that meets certain customer specifications, such as insertion delays between specified pins and/or operation (clock) frequency. A relatively large number of iterations may be needed to reach an acceptable configuration because, for example, of the unknown impact of CLB placement on routing resources, such as wires of structure 106. As a result, finding an optimum configuration may require substantial computer resources. For a similar reason, only a sub-optimal configuration might be found within the allotted (or feasible) computer time, the implementation of which configuration will not exercise the full potential of the hardware and will unnecessarily limit the circuit performance.

SUMMARY

The problems in the prior art are addressed in accordance with the principles of the present invention by a method of mapping a plurality of configurable logic blocks (CLBs) in a programmable logic device, such as a field-programmable gate array (FPGA). In certain embodiments, the method includes adaptively adjusting one or more customer-specified constraints (i.e., adjusting constraints based on the performance of the current configuration) and can be implemented, for example, using a simulated annealing algorithm. During the refinement of the placement (i.e., assignment) of logic blocks in an FPGA, one or more constraints are adjusted dynamically by either selecting a customer-specified constraint value or specifying a new constraint value derived based on the actual circuit performance. The method improves circuit performance, e.g., by enabling higher circuit operation frequencies, and provides substantial savings of computer time compared to the prior art placement methods, in which constraints are adjusted in a manner that is independent of actual circuit performance.

According to one embodiment, the present invention is a method of mapping a plurality of configurable logic blocks (CLBs) in a programmable logic device (PLD). According to the method, a mapping of the CLBs in the PLD is generated, circuit performance for the mapping is evaluated based on one or more constraints, and at least one of the one or more constraints is adjusted based on the circuit performance.

According to another embodiment, the present invention is a final mapping of a plurality of CLBs in a PLD, the final mapping generated by implementing the previously described method. According to yet another embodiment, the present invention is a machine-readable medium, having encoded thereon program code, wherein, when the program code is executed by a machine, the machine implements the previously described method.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Before embodiments of the present invention are described in detail, a brief description of timing-driven placement (TDP) is given below.

Placement is part of the design process, during which CLB nets (such as net 110 in FIG. 1B) are mapped onto physical locations in an FPGA. TDP placement is a placement method based on optimizing circuit delays. TDP methods have been classified as either net-based or path-based. Net-based TDP methods seek to control delays, e.g., by imposing a delay upper bound to each net, which is related to the size of the net bounding box, such as box 120 for net 110 of FIG. 1B. Path-based TDP methods seek to explicitly take into account delays corresponding to each signal propagation path. Optimization of relatively large FPGAs is typically net-based since explicit enumeration of all paths becomes a difficult task. One example of an algorithm that may be used in TDP placement is a simulated annealing (SA) algorithm.

Figure 2:
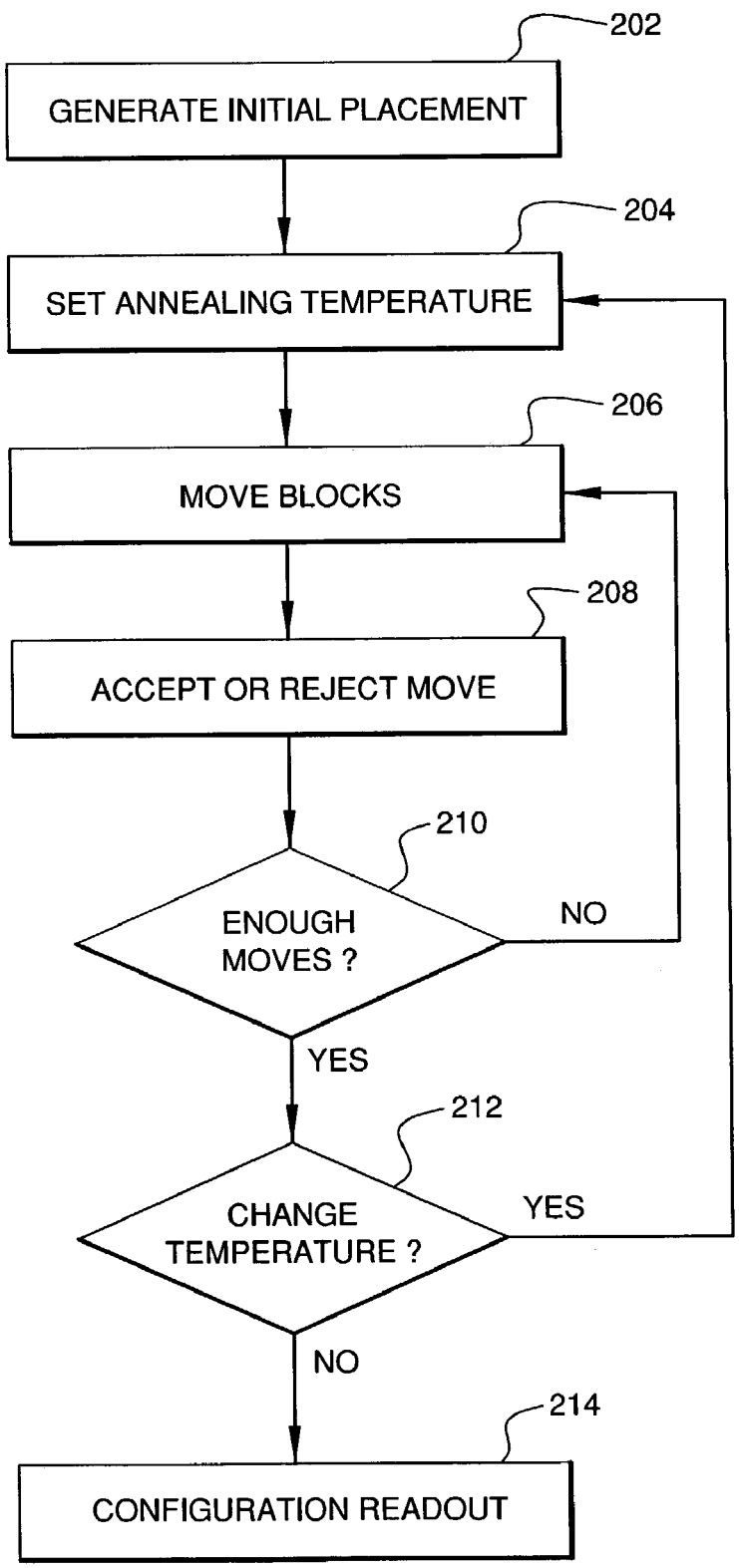
FIG. 2 is a flowchart of a simulated annealing (SA) algorithm that may be used during timing-driven placement (TDP)

FIG. 2 is a flowchart of an SA algorithm 200. Algorithm 200 begins in process block 202, where CLBs and I/O blocks (such as CLBs 102 and I/O blocks 104 of FPGA 100) are mapped randomly onto the corresponding physical locations in the FPGA. Then, in block 204, annealing temperature (T) is selected. In blocks 206 and 208, the placement is iteratively improved by randomly swapping blocks between physical locations (i.e., changing block assignments) and evaluating the "goodness" of each swap with a cost function (C). A swap may include, e.g., one assigned CLB (i.e., a CLB belonging to one or more nets) and one unassigned CLB or two assigned CLBs. If a swap reduces the cost function, then it is accepted. If a swap increases the cost function, then the probability of accepting the swap is calculated as follows:

$$P = \exp\left(-\frac{\Delta C}{T}\right) \quad (1)$$

where $\Delta C$ is the increase in the cost function C and T is the current annealing temperature. A suitable random number generator is then used to determine whether to accept or reject the swap based on the corresponding probability P.

Process blocks 206 and 208 are repeated a relatively large (typically fixed) number of times to allow the system to come to a "thermal equilibrium." After it is determined in block 210 that enough swaps have been attempted, the algorithm proceeds to block 212 to determine if the annealing temperature needs to be changed (e.g., reduced). Typically, algorithm 200 implements a pre-selected "annealing" procedure involving a pre-selected sequence of annealing temperatures. In certain implementations, the annealing procedure may have a single annealing temperature. In accordance with the annealing procedure, if there is another temperature in the pre-selected sequence, then the processing returns to block 204, where a new value of the annealing temperature is selected and the processing of blocks 206–210 is repeated using the current configuration. Otherwise, after the entire sequence of annealing temperatures has been applied, the algorithm is terminated in block 214 and the final circuit configuration is read out.

An SA TDP algorithm may be directed to optimize circuit configuration based on different timing criteria loaded into the cost function. For example, in one implementation, the algorithm is directed to meet the customer's timing budget. More specifically, the customer sets a constraint for a delay value and the algorithm is run to meet that constraint (possibly with some margin). In another implementation, the algorithm is directed to optimize a particular aspect of the circuit performance. For example, an acceptable clock frequency (which is related to circuit delays) is provided by the customer, and the algorithm is run to achieve an optimum (e.g., a maximum) clock frequency in the vicinity of the acceptable clock frequency. In yet another implementation, the optimization goal may be based on a combination of criteria corresponding to the previous two implementations. For example, an FPGA may have several net groups, each group operating at a different clock frequency. Then, for one or more net groups, the customer specifies respective timing budgets. In addition, for one or more different net groups, the customer specifies respective acceptable clock frequencies. The algorithm is then run to meet the combination of criteria.

Figure 1A:
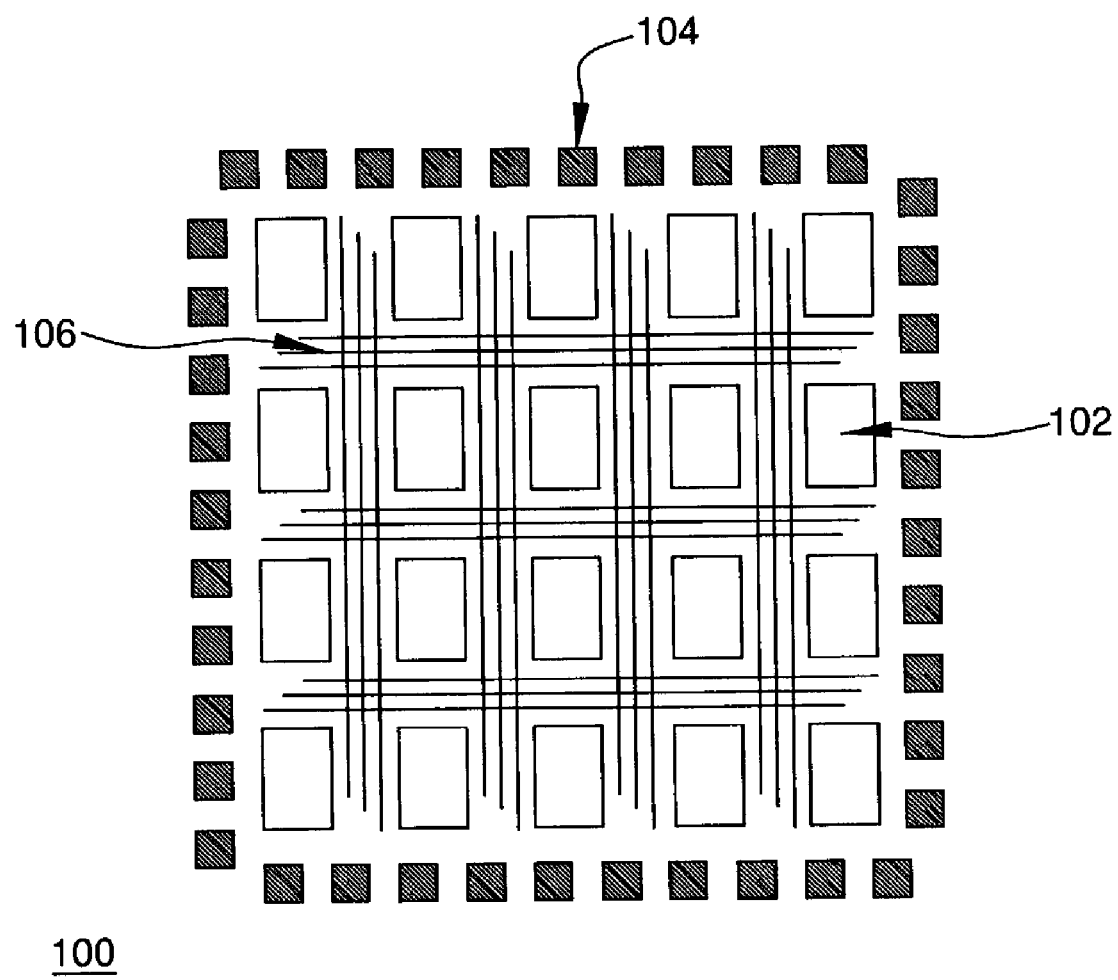
FIGS. 1A–B show a block diagram of a representative FPGA.
Figure 1B:
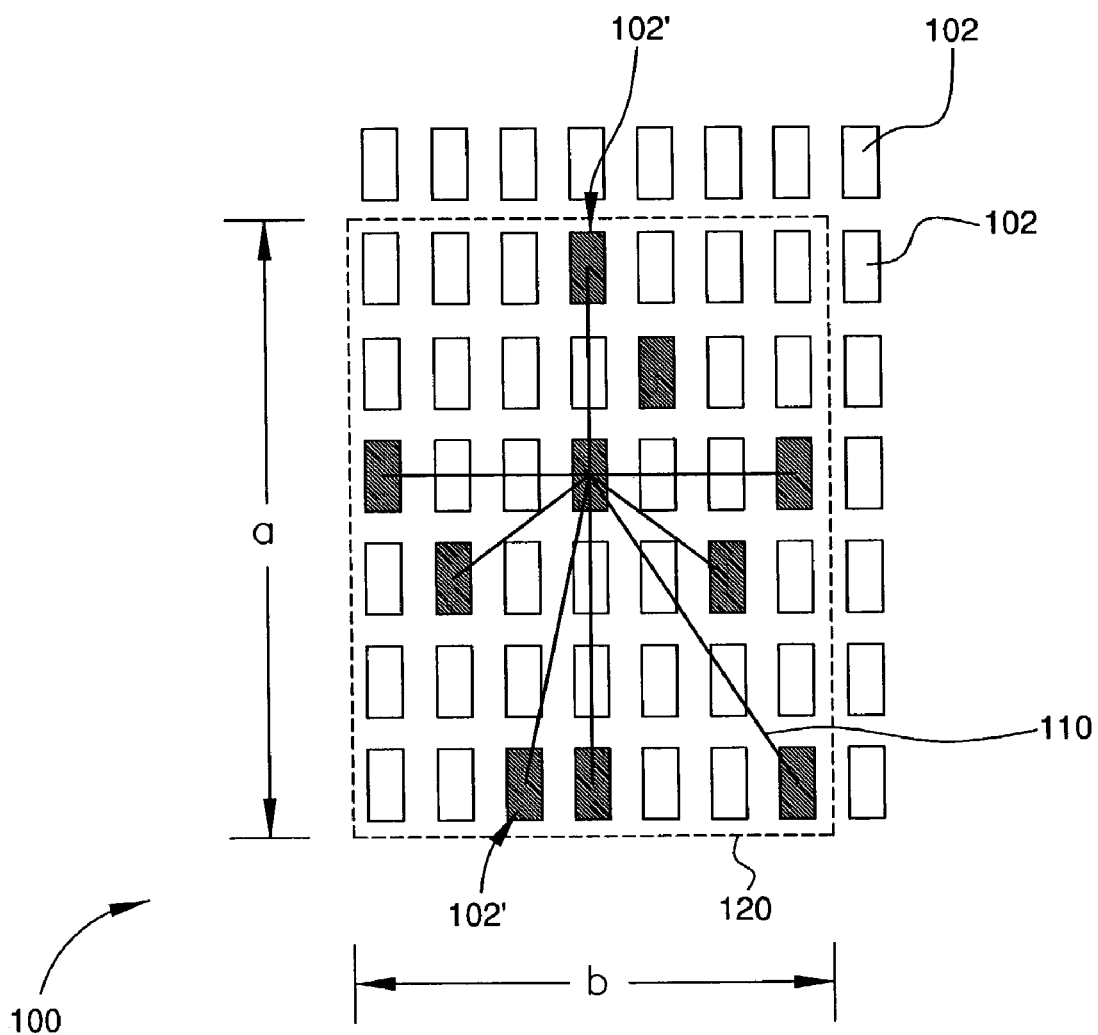

The following equation gives a representative cost function (C) that may be used in an SA TDP algorithm:

$$C = \sum_i w_1 R_i + w_2 D_i \quad (2)$$

where $R_i$ is the routability cost of a net; $D_i$ is the timing cost of a net; i is an index corresponding to different nets; $w_1$ and $w_2$ are weighting coefficients; and the summation is taken over all nets in the FPGA. The following is a representative expression for the routability cost:

$$R_i = q_i(a_i + b_i) \quad (3)$$

where $a_i$ and $b_i$ are the dimensions of the bounding box for the i-th net, for example, as indicated in FIG. 1B for net 110; and $q_i$ is a factor depending on the number of blocks in the net. In one implementation, $q_i$ is a linear function of the number of blocks in the net. The timing cost ($D_i$) is a function of slack, where the slack ($s_i$) for the i-th net is defined as follows:

$$s_i = t_{ri} - t_{ai} \quad (4)$$

where $t_{ri}$ is the customer-specified constraint for the i-th net, and $t_{ai}$ is the actual delay for that net realized by a current configuration.

Figure 3:
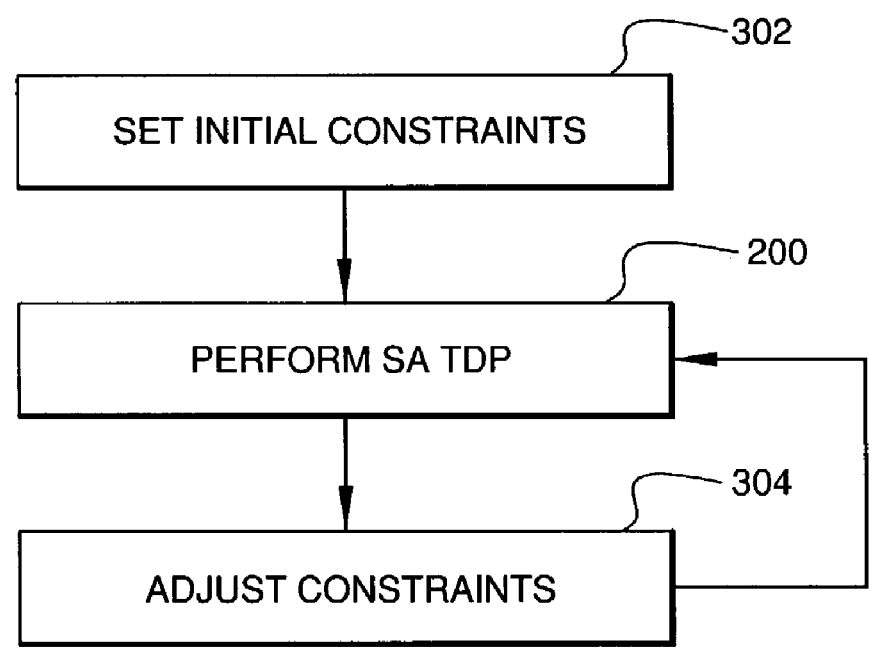
FIG. 3 is a flowchart of an SA TDP-based optimization method directed to optimization of the FPGA of FIG. 1.

FIG. 3 is a flowchart of a TDP-based optimization method 300 employing algorithm 200 and directed to optimization of the clock frequency in selected nets of an FPGA. In process block 302 of method 300, the customer specifies one or more initial constraints (e.g., initial values of $t_{ri}$). Then, algorithm 200 is run using the constraints specified in block 302. It is important to note that the value of each $t_{ri}$ remains constant during the execution of algorithm 200. In block 304, one or more constraints are adjusted, e.g., tightened by 20%, and algorithm 200 is run again using the adjusted constraints and the readout configuration of the preceding run as the initial placement. The iterative cycle of block 304 and algorithm 200 is repeated until, e.g., the clock frequency can no longer be improved.

Since method 300 includes subjective (customer input) blocks 302 and 304, the results obtained with this method depend on the quality of choices made in those blocks. Typically, to obtain good results with method 300, the constraints need to fall within optimum ranges, which ranges are not known a priori. For example, setting a very aggressive (high) target for the clock frequency will result in the timing cost ($D_i$) dominating the cost function (Equation (2)). As a result, the routability will suffer and the obtained configuration will be sub-optimal. Similarly, setting a low target for the clock frequency will result in a premature termination of the optimization process and the obtained configuration will again be sub-optimal. In addition, method 300 becomes too computationally expensive when, for example, multiple clock frequencies need to be optimized.

In particular, the number of iterations (using block 304 and algorithm 200) that is required to scan through different combinations of constraints may become computationally prohibitive.

Figure 4:
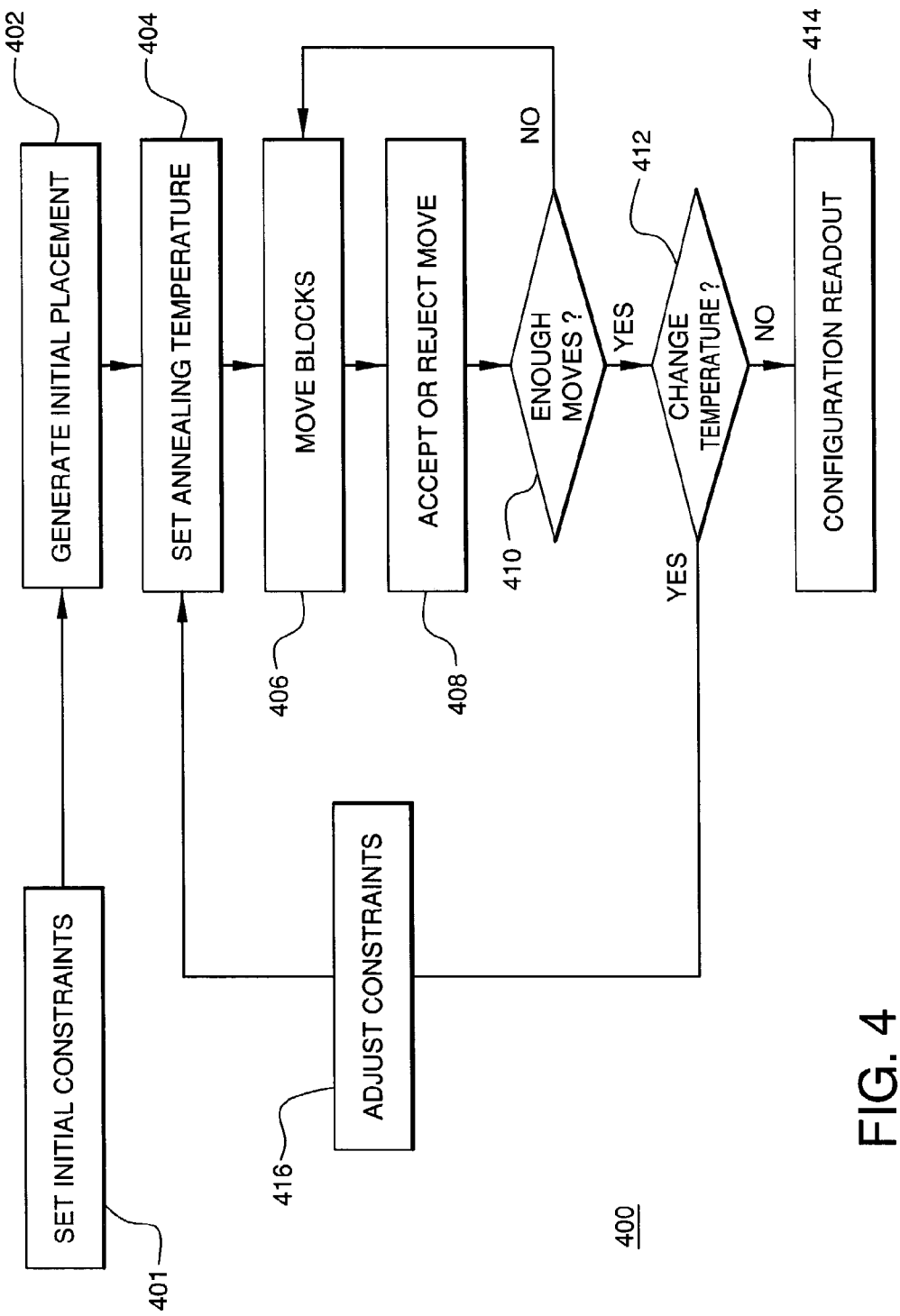
FIG. 4 is a flowchart of an SA TDP-based optimization method directed to optimization of the FPGA of FIG. 1 according to one embodiment of the present invention.

FIG. 4 is a flowchart of an SA TDP-based optimization method 400 directed to optimization of a PLD, such as FPGA 100 of FIG. 1, according to one embodiment of the present invention. Parts of method 400 are similar to those of method 300 of FIG. 3. In particular, process block 401 is similar to process block 302. In addition, blocks 402–414 are similar to blocks 202–214, respectively, of algorithm 200 of FIG. 2. However, one difference between method 400 and method 300 is that method 400 includes block 416, in which one or more constraints may be adaptively changed during a run of the SA algorithm. For example, one or more constraints may be updated in block 416 before the annealing temperature is changed in block 404. In that case, SA calculations at the next temperature (blocks 406–410) are performed using the updated constraints. This is different from method 300, in which the constraints are kept constant during each full run of algorithm 200. Note that, although block 416 is depicted as falling between blocks 412 and the return to block 404, it could equivalently be implemented between block 410 and block 412.

According to the present invention, when a constraint is adjusted, it is adjusted adaptively as a function of the performance of the current configuration. In one embodiment, in block 416, the adjustment of constraints is dictated by Equation (5) as follows:

$$t'_{ri} = \min(gt_{wi}, t_{ri}) \quad (5)$$

where $t_{wi}$ is the worst actual delay for the i-th net in the current configuration and g is a coefficient and $t_{ri}$ is the customer-specified constraint for the i-th net. Preferably, a value of g is chosen from the range between 1.3 and 1.4. The slack ($s_i$) for the i-th net is then calculated using Equation (6):

$$s_i = t'_{ri} - t_{ai} \quad (6)$$

During early stages (high temperatures) of simulated annealing, Equation (6) is equivalent to Equation (4) because the FPGA configuration is not yet optimal, $gt_{wi} > t_{ri}$, and $t'_{ri} = t_{ri}$. However, during late stages (low temperatures) of simulated annealing, the configuration is sufficiently refined, such that the value of $gt_{wi}$ becomes smaller than $t_{ri}$ and Equation (6) transforms into the following equation:

$$s_i = gt_{wi} - t_{ai} \quad (7)$$

Since the timing cost ($D_i$) is a function of slack, $D_i$ becomes uncoupled from the customer-specified constraints during the late stages. As a result, the optimization process becomes self-guided, which reduces the influence of the subjectively selected customer constraints on the output.

In general, for a given run of simulated annealing, constraints will typically not be adjusted when the annealing temperature is high. As the annealing temperature gets lower, more and more constraints will begin to be adjusted in block 416 and those adjustments will depend on the performance of the current configuration.

In one embodiment, the following timing cost function is used:

$$D_i = t_{ai}\left(1 - \frac{s_i}{t_{wi}}\right)^8 \quad (8)$$

where $s_i$ is calculated using Equation (6). In a different embodiment, a different timing cost function may be used.

Figure 5:
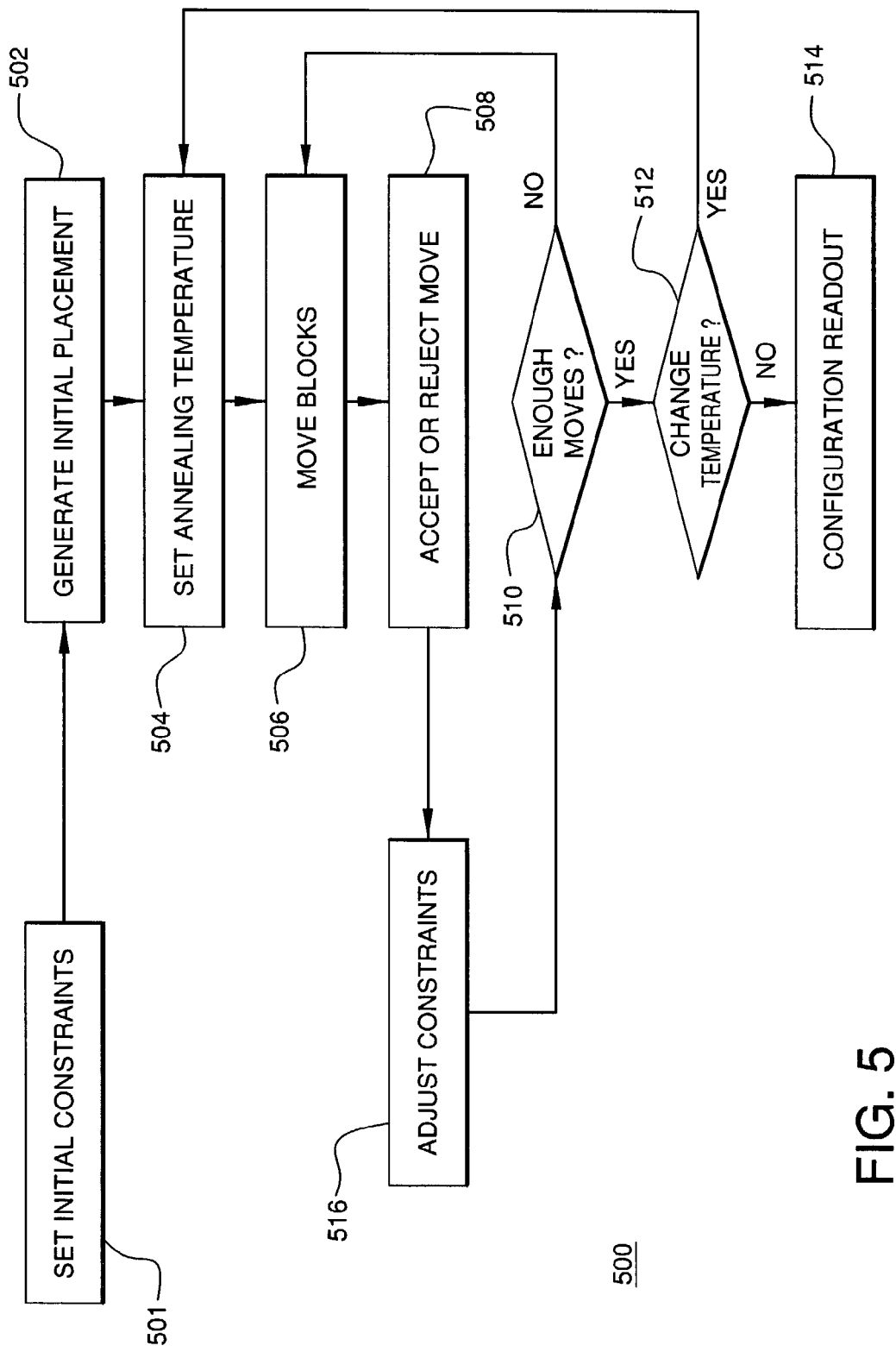
FIG. 5 is a flowchart of an SA TDP-based optimization method directed to optimization of the FPGA of FIG. 1 according to another embodiment of the present invention.

FIG. 5 is a flowchart of an SA TDP-based optimization method 500 directed to optimization of a PLD, such as FPGA 100 of FIG. 1, according to another embodiment of the present invention. Parts of method 500 are similar to those of method 400 of FIG. 4. In particular, process blocks 501–514 are similar to blocks 401–414. In addition, block 516 is similar to block 416. However, one difference between method 500 and method 400 is that block 516, in which one or more constraints may be adaptively changed during a run of the SA algorithm, is performed between blocks 508 and 510. In one implementation, block 516 is performed each time a predetermined number of moves has been accepted in block 508. Alternatively, block 516 may be performed a fixed number (2) of times for each annealing temperature. In one possible implementation, only one annealing temperature is used. In that case, block 516 is implemented two or more times at that single annealing temperature.

Table I compares the results of configuration optimization obtained by applying methods 300 and 400 to a representative benchmark circuit, more details on which circuit can be retrieved from the following web address: http://www.cbl.ncsu.edu/pub/Benchmark_dirs/HLSynth92/Kalman. Briefly, the circuit includes the following: 6383 look-up tables; 3699 flip-flops; 4 embedded memory blocks; 114 I/O blocks; and 6 global clocks.

TABLE I

Clock Frequency Optimization

| Constraint (MHz) | Method 300 (MHz) | Method 400 (MHz) | Improvement (%) |
|---|---|---|---|
| Infinity | 49.5 | 54.8 | 10.71 |
| 1000 | 52.8 | 54.8 | 3.79 |
| 200 | 53.4 | 54.8 | 2.62 |
| 66.67 | 53.4 | 54.8 | 2.62 |
| 58.82 | 52.4 | 54.8 | 4.58 |
| 55.56 | 50.5 | 54.8 | 8.51 |
| 50 | 48.9 | 54.8 | 12.07 |
| 40 | 47.4 | 54.8 | 15.61 |

The first column of the table shows a list of frequencies, each frequency corresponding to a customer constraint specified for different runs of method 300 (in block 302) and of method 400 (in block 401). The second and third columns show the results obtained using method 300 and method 400, respectively, with the constraint indicated in the first column. The fourth column shows a relative improvement of the optimal frequency obtained with method 400 over that of method 300.

As indicated in the table, the outcome of method 400 is consistently better than that of method 300, on average by 7.6%. The improvement is particularly substantial when the customer-specified constraint falls outside an optimal constraint range. For example, an improvement of 12% is achieved for the constraint corresponding to 50 MHz. In addition, method 400 provided substantial savings of computer time because of a single simulated annealing run utilized in method 400 compared to multiple SA runs in method 300. Improvements similar to those indicated in the table were also obtained for a number of proprietary circuits, with an average frequency improvement of about 12%.

While this invention has been described with reference to illustrative embodiments, this description is not intended to be construed in a limiting sense.

In the embodiment of the present invention shown in FIG. 4, constraints are adjusted (if at all) between block 412 and the return to block 404. In other words, constraints may be adjusted during a simulated annealing run, after all of the potential moves at the current annealing temperature have been tested. The present invention is not so limited. In general, according to the present invention and depending on the particular implementation, one or more constraints may be adaptively adjusted (i.e., based on the performance of the current configuration) at any suitable time, which might include after a specified number of moves are tested (e.g., between blocks 408 and 410 of FIG. 4), after a specified number of temperatures have been applied (e.g., at block 416) and/or between the completion of a full annealing run and the start of the next annealing run (e.g., during a block analogous to block 304 of FIG. 3). It is also possible that one or more of the constraints are adjusted in a "non-adaptive" manner (i.e., independent of the performance of the current configuration) as long as at least one constraint is adaptively adjusted.

Although, adaptive adjustment of constraints was described in reference to simulated annealing, it may also be used with other optimization algorithms/methods, such as, for example, a partition-placement algorithm or a min-cut placement algorithm. These algorithms use algorithm convergence parameters different from annealing temperature. Application of the present invention to optimization methods employing those algorithms could involve changing one or more constraints in the context of changes to those algorithm convergence parameters during the optimization process.

In addition, adaptive adjustment of constraints may be applied to different PLD architectures (e.g., block-structured or channel-structured) and implementation technologies (e.g., SRAM or anti-fuse) as well as PLDs other than FPGAs, such as Field-Programmable Logic Arrays (PLAs), Simple Programmable Logic Devices (SPLDs), and Complex Programmable Logic Devices (CPLDs).

Although modification of the current placement configuration has been described in the context of swapping pairs of blocks, the invention is not so limited. In general, the present invention can be implemented using any suitable placement modification, including those involving more than two blocks at a time.

Although the present invention has been described in the context of time constraints, alternative or additional constraints, such as those related to power, routing congestion, or routing overlaps, may be applied.

Various modifications of the described embodiments, as well as other embodiments of the invention, which are apparent to persons skilled in the art to which the invention pertains are deemed to lie within the principle and scope of the invention as expressed in the following claims.

The present invention may be implemented as circuit-based processes, including possible implementation on a single integrated circuit. As would be apparent to one skilled in the art, various functions of circuit elements may also be implemented as part of a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Although the acts in the following method claims, if any, are recited in a particular sequence with corresponding labeling, unless the claim recitations otherwise imply a particular sequence for implementing some or all of those acts, those acts are not necessarily intended to be limited to being implemented in that particular sequence.

What is claimed is:

1. A computer-implemented method of mapping a plurality of configurable logic blocks (CLBs) in a programmable logic device (PLD), the method comprising:

initializing a performance constraint;

generating an initial mapping of the CLBs in the PLD; and applying a simulated annealing algorithm to the initial mapping to generate a final mapping of the CLBs in the PLD, wherein the simulated annealing algorithm comprising:

generating a first modified mapping of the CLBs in the PLD;

characterizing circuit performance of the first modified mapping;

comparing the circuit performance of the first modified mapping to the performance constraint to determine whether to accept of reject the first modified mapping;

modifying the performance constraint;

generating a second modified mapping of the CLBs in the PLD;

characterizing circuit performance of the second modified mapping; and comparing the circuit performance of the second modified mapping to the modified performance constraint to determine whether to accept of reject the second modified mapping.

2. The invention of claim 1, wherein the performance constraint is modified based on circuit performance corresponding to an intermediate mapping generated during the simulated annealing algorithm.

3. The invention of claim 1, wherein the performance constraint is a timing constraint.

4. The invention of claim 1, wherein applying the simulated annealing algorithm includes swapping blocks between physical locations and evaluating the swap with a cost function.

5. The invention of claim 1, wherein the performance constraint is modified after generating an intermediate mapping with one value of annealing temperature and before initiating generating a next mapping with a next value of annealing temperature.

6. The invention of claim 1, wherein the final mapping is generated by modifying one or mare constraints, wherein at least one of the one or more constraints is modified at most once for each different value in a set of unique values for annealing temperature.

7. The invention of claim 1, wherein the final mapping is generated by modifying one or more constraints, wherein at least one of the one or more constraints is modified two or more times at at least one value of annealing temperature.

8. The invention of claim 1, wherein modifying the performance constraint includes comparing two potential values for said constraint, wherein:
    a first potential value for the constraint is based on the performance of a current mapping;
    a second potential value of the constraint is a constant; and
    the constraint is modified only if the first potential value corresponds to better performance than the second potential value.

9. The invention of claim 8, wherein:
    if the performance of CLBs is not modified, then the value of the performance constraint is maintained at the second potential value; and
    if the performance constraint is modified, then the value of the performance constraint is changed to the first potential value.

10. The invention of claim 8, wherein:
    the plurality of CLBs corresponds to a plurality of nets, each net including two or more CLBs;
    the performance constraint is a timing constraint for one of the nets;
    the first potential value is a function of a circuit delay for the net in the current mapping;
    the second potential value is a specified initial value of the circuit delay for the net; and
    the performance constraint is set to the smaller of the first and second potential values.

11. The invention of claim 10, wherein the function of the circuit delay is the product of the circuit delay for the net in the current mapping and a specified coefficient having a value greater than one.

12. A final mapping of a plurality of CLBs in a PLD, the final mapping generated by implementing on a computer a method comprising:
    initializing a performance constraint;
    generating an initial mapping of the CLBs in the PLD; and
    applying a simulated annealing algorithm to the initial mapping to generate the final mapping of the CLBs in the PLD, wherein the simulated annealing algorithm comprises:
    generating a first modified mapping of the CLBs in the PLD;
    characterizing circuit performance of the first modified mapping;
    comparing the circuit performance of the first modified mapping to the performance constraint to determine whether to accept of reject the first modified mapping;
    modifying the performance constraint;
    generating a second modified mapping of the CLBs in the PLD;
    characterizing circuit performance of the second modified mapping; and
    comparing the circuit performance of the second modified mapping to the modified performance constraint to determine whether to accept of reject the second modified mapping.

13. A programmed PLD having a plurality of CLBs, the PLD having a final mapping of the CLBs in the PLD, the final mapping generated by implementing on a computer a method comprising:
    initializing a performance constraint;
    generating an initial mapping of the CLBs in the PLD; and
    applying a simulated annealing algorithm to the initial mapping to generate the final mapping of the CLBs in the PLD, wherein the simulated annealing algorithm comprises;
    generating a first modified mapping of the CLBs in the PLD;
    characterizing circuit performance of the first modified mapping;
    comparing the circuit performance of the first modified mapping to the performance constraint to determine whether to accept of reject the first modified mapping;
    modifying the performance constraint;
    generating a second modified mapping of the CLBs in the PLD;
    characterizing circuit performance of the second modified mapping; and
    comparing the circuit performance of the second modified mapping to the modified performance constraint to determine whether to accept of reject the second modified mapping.

14. A machine-readable medium, having encoded thereon program code, wherein, when the program code is executed by a machine, the machine implements a method of generating a final mapping of a plurality of CLBs in a PLD, the method comprising:
    initializing a performance constraint;
    generating an initial mapping of the CLBs in the PLD; and
    applying a simulated annealing algorithm to the initial mapping to generate the final mapping of the CLBs in the PLD, wherein the simulated annealing algorithm comprises;
    generating a first modified mapping of the CLBs in the PLD;
    characterizing circuit performance of the first modified mapping;
    comparing the circuit performance of the first modified mapping to the performance constraint to determine whether to accept of reject the first modified mapping;
    modifying the performance constraint;
    generating a second modified mapping of the CLBs in the PLD;
    characterizing circuit performance of the second modified mapping; and
    comparing the circuit performance of the second modified mapping to the modified performance constraint to determine whether to accept of reject the second modified mapping.

15. The invention of claim 14, wherein the performance constraint is modified based on circuit performance corresponding to an intermediate mapping generated during the simulated annealing algorithm.

16. The invention of claim 13, wherein applying the simulated annealing algorithm includes swapping blocks between physical locations and evaluating the swap with a cost function.

17. The invention of claim 14, wherein the performance constraint is modified after generating an intermediate mapping with one value of annealing temperature and before initiating generating a next mapping with a next value of annealing temperature.

18. The invention of claim 14, wherein the final mapping is generated by modifying one or more constraints, wherein at least one of the one or more constraints is modified at most once for each different value in a set of unique values for annealing temperature.

19. The invention of claim 14, wherein the final mapping is generated by modifying one or more constraints, wherein at least one of the one or more constraints is modified two or more times at at least one value of annealing temperature.

* * * * *

UNITED STATES PATENT AND TRADEMARK OFFICE
CERTIFICATE OF CORRECTION

PATENT NO. : 7,000,210 B2
APPLICATION NO. : 10/288667
DATED : February 14, 2006
INVENTOR(S) : Wu et al.

It is certified that error appears in the above-identified patent and that said Letters Patent is hereby corrected as shown below:

Col. 8 line 37: replace "accept of reject" with -- accept or reject --.
Col. 8 line 62: replace "mare" with -- more --.
Col. 9 line 47, line 55: replace "accept of reject" with -- accept or reject --.
Col. 10 line 7, line 15: replace "accept of reject" with -- accept or reject --.
Col. 10 line 33, line 41: replace "accept of reject" with -- accept or reject --.

Signed and Sealed this

Eighth Day of May, 2007

JON W. DUDAS
*Director of the United States Patent and Trademark Office*